(12) United States Patent  (10) Patent No.: US 10,609,026 B2
Han et al.  (45) Date of Patent: Mar. 31, 2020

(54) DATA COMMUNICATION METHOD USING SECURE ELEMENT AND ELECTRONIC SYSTEM ADOPTING THE SAME

(71) Applicant: Samsung Electronics Co., Ltd., Suwon-si, Gyeonggi-do (KR)

(72) Inventors: Jerome Han, Daejeon (KR); Ki-hyoun Kwon, Hwaseong-si (KR); Jun-ho Lee, Hwaseong-si (KR); Sung-hoon Son, Suwon-si (KR); Seung-ho Lee, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 682 days.

(21) Appl. No.: 15/067,170

(22) Filed: Mar. 10, 2016

(65) Prior Publication Data

US 2016/0294826 A1  Oct. 6, 2016

(30) Foreign Application Priority Data

Apr. 3, 2015 (KR) .................. 10-2015-0047516

(51) Int. Cl.
*H04L 29/06* (2006.01)
*G06Q 20/40* (2012.01)
(Continued)

(52) U.S. Cl.
CPC ..... *H04L 63/0869* (2013.01); *G06Q 20/3226* (2013.01); *G06Q 20/3227* (2013.01);
(Continued)

(58) Field of Classification Search
CPC ............. H04L 63/0869; H04L 63/0876; H04L 63/105; H04L 63/12; H04L 9/0861;
(Continued)

(56) References Cited

U.S. PATENT DOCUMENTS 7,275,685 B2 * 10/2007 Gray .................. G06Q 20/10
235/380
8,285,211 B2  10/2012 Wang et al.
(Continued)

FOREIGN PATENT DOCUMENTS

KR  20110122452  11/2011
KR  101289545  7/2013
KR  20140023606  2/2014

OTHER PUBLICATIONS

Arfaoui et al., "Trusted Execution Environments: A look under the hood," 2014 2nd IEEE International Conference on Mobile Cloud Computing, Services, and Engineering, IEEE, 2014, all pages. (Year: 2014).*

(Continued)

*Primary Examiner* — Jacob C. Coppola
(74) *Attorney, Agent, or Firm* — Renaissance IP Law Group LLP

(57) ABSTRACT

Provided are a data communication method using a secure element and an electronic system adopting the same. The data communication method includes: exchanging certificate information between an application processor of an electronic device and a secure element; setting up a secure channel through mutual authentication between the application processor and the secure element by using a public key and a secret key after the exchange of the certification information; and performing data communication between the application processor and the secure element through the secure channel.

8 Claims, 15 Drawing Sheets

(51) Int. Cl.
*H04W 12/06* (2009.01)
*G06Q 20/32* (2012.01)
*H04L 9/32* (2006.01)
*H04W 12/08* (2009.01)
*H04W 88/02* (2009.01)

(52) U.S. Cl.
CPC ....... G06Q 20/4012 (2013.01); H04L 9/3234 (2013.01); H04L 63/0823 (2013.01); H04W 12/06 (2013.01); H04W 12/0806 (2019.01); H04L 63/083 (2013.01); H04L 2209/56 (2013.01); H04L 2209/80 (2013.01); H04W 88/02 (2013.01)

(58) Field of Classification Search
CPC ..... H04L 9/0863; H04L 9/30; H04L 63/0823; H04L 63/083; G06Q 20/3226; G06Q 20/3227; G06Q 20/3229; G06Q 20/325; G06Q 20/401; G06Q 20/4014; G06Q 20/4012; G06Q 20/4016; H04W 12/02; H04W 12/06; H04W 88/02
USPC .......................................................... 705/72
See application file for complete search history.

(56) References Cited

U.S. PATENT DOCUMENTS

| | | | |
|---|---|---|---|
| 8,532,572 B2 * | 9/2013 | Renard | G06Q 20/32 455/41.1 |
| 8,712,407 B1 | 4/2014 | Cope et al. | |
| 8,751,314 B2 | 6/2014 | Fisher | |
| 8,799,085 B2 | 8/2014 | Fisher | |
| 2006/0259790 A1 | 11/2006 | Asokan et al. | |
| 2009/0070272 A1 * | 3/2009 | Jain | G06K 19/07739 705/75 |
| 2010/0241494 A1 * | 9/2010 | Kumar | G06Q 20/204 705/14.1 |
| 2012/0064828 A1 * | 3/2012 | Khan | H04L 63/0492 455/41.1 |
| 2013/0085941 A1 | 4/2013 | Rosenblatt et al. | |
| 2013/0097083 A1 | 4/2013 | Fisher | |
| 2013/0346245 A1 | 12/2013 | Desore | |
| 2014/0095918 A1 | 4/2014 | Stahl et al. | |
| 2014/0164254 A1 * | 6/2014 | Dimmick | G06Q 20/4012 705/71 |
| 2014/0317686 A1 * | 10/2014 | Vetillard | G06F 21/74 726/2 |
| 2015/0371226 A1 * | 12/2015 | Hurley | G06Q 20/40 705/64 |
| 2016/0218876 A1 * | 7/2016 | Warnez | H04L 9/3234 |

OTHER PUBLICATIONS

Ekberg et al., "The Untapped Potential of Trusted Execution Environments on Mobile Devices," IEEE, 2014, all pages. (Year: 2014).*

Rodriques et al., "MobiPag: Integrated Mobile Payment, Ticketing and Couponing Solution Based on NFC," Sensors 2014, all pages. (Year: 2014).*

* cited by examiner

DATA COMMUNICATION METHOD USING SECURE ELEMENT AND ELECTRONIC SYSTEM ADOPTING THE SAME

CROSS-REFERENCE TO RELATED APPLICATION

This application claims the benefit of Korean Patent Application No. 10-2015-0047516, filed on Apr. 3, 2015, in the Korean Intellectual Property Office, the disclosure of which is incorporated herein in its entirety by reference.

BACKGROUND

Embodiment relate to a data processing method and a data processing device, and more particularly, to a data communication method using a secure element and an electronic system with the same.

Recently, mobile devices have provided more diverse services and additional functions. In order to improve the utility of the mobile devices and satisfy various demands of users, a variety of applications executable by the mobile devices have been developed. The expanding scope of functions of mobile devices may introduce security risks.

SUMMARY

An embodiment includes a data communication method including exchanging certificate information between an application processor of an electronic device and a secure element; setting up a secure channel through mutual authentication between the application processor and the secure element by using a public key and a secret key after the exchange of the certification information; and performing data communication between the application processor and the secure element through the secure channel.

An embodiment includes an electronic system comprising: a point of sales (POS) terminal configured to provide a payment service using a communication network; and an electronic device configured to perform a payment process using coupon credential through data communication with the POS terminal, wherein the electronic device comprises: a secure element configured to store the coupon credential, user information, and payment information; and an application processor configured to perform data communication with the secure element for data processing related to a coupon management service and the payment service, wherein the application processor is further configured to set up a secure channel through mutual authentication with the secure element and perform the data communication with the secure element through the secure channel.

An embodiment includes a data communication method comprising: receiving, by an application processor, a request for access to a secure element; determining, by the application processor, if a secure channel is set up between the application processor and the secure element; if the secure channel is not set up, setting up the secure channel between the application processor and the secure element through mutual authentication with the secure element; and performing data communication between the application processor and the secure element through the secure channel.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
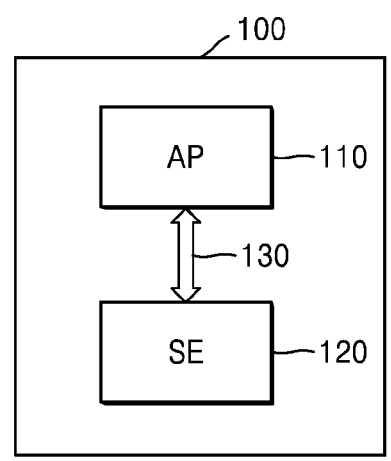
FIG. 1 is a diagram of a configuration of an electronic device according to an embodiment.

Embodiments will now be described more fully hereinafter with reference to the accompanying drawings, in which particular embodiments are shown. Embodiments may, however, take many different forms and should not be construed as being limited to the particular embodiments set forth herein; rather, these embodiments are provided so that this disclosure will be thorough and complete, and will fully convey the concepts to those of ordinary skill in the art. It should be understood, however, that there is no intent to limit the embodiments to the particular forms disclosed, but on the contrary, the embodiments cover all modifications, equivalents, and alternatives falling within the spirit and scope as described herein. Like reference numerals denote like elements throughout the specification and drawings. In the drawings, the dimensions of structures are exaggerated for clarity. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram of a configuration of an electronic device 100 according to an embodiment. Referring to FIG. 1, the electronic device 100 may include an application processor (AP) 110 and a secure element (SE) 120.

Examples of the electronic device 100 may include a mobile device, a personal computer, a digital camera, a navigation device, and a smart card system. Specifically, examples of the mobile device may include a personal digital assistant (PDA), a cellular phone, a tablet computer, and a smart phone.

The application processor 110 may be configured to control overall operation of the electronic device 100, control signal flows between internal components of the electronic device 100, and perform data processing. Specifically, the application processor 110 may be configured to control hardware or software of the electronic device 100 by executing an operating system or applications, and execute various types of data processing and operations. The application processor 110 may be configured to manage data links for communication between the electronic device 100 and other external devices connected to the electronic device 100 through networks and perform conversion of a communication protocol. Specifically, the application processor 110 may be configured to perform data communication related to electronic business services with the other external devices. For example, the data communication related to electronic business services may include data communication for at least one of a coupon issuance process, a coupon redemption process, and a payment process.

Examples of an application to be executed by the application processor 110 may include an application necessary to perform mutual authentication with the secure element 120, and an application necessary to perform a coupon service through communication between external devices.

For example, execution environments in the application processor 110 may be divided into a rich execution environment (REE) and a trusted execution environment (TEE). That is, the application processor 110 may have an REE in which a rich operating system executes an application and a TEE in which a trusted operating system executes an application.

The REE may be referred to as a non-trusted execution environment (NTEE). The REE refers to a non-secure execution environment, and the TEE refers to a secure execution environment.

The secure element 120 is a platform capable of installing and managing applications. The secure element 120 may include hardware, software, an interface, and a protocol, which allow execution of applications for security storage, payment, authentication, or various other services. In a particular example, the secure element 120 may include a communication interface, a processor coupled to the communication interface, internal storage, such as volatile and non-volatile memory, or the like. In some embodiments, operations of the secure element 120 described herein, may be a result of execution of instructions on such a processor in response to communications received through the communication interface.

In some embodiments, the secure element 120 may be mounted as a universal integrated circuit card (UICC) insertable to a slot of the electronic device 100 or may be embedded in the electronic device 100. Thus, in an embodiment, the application processor 110 and the secure element 120 may each include a communication interface with signal lines such as clock, reset, input/output signal lines, or the like that connect the application processor 110 and the secure element 120. In some embodiments, circuitry, such as buffers, repeaters, or the like, may be present between the application processor 110 and the secure element 120.

For example, the secure element 120 may be configured to store an application necessary to perform mutual authentication with the application processor 110, an application necessary to perform a coupon service, or an application necessary to perform a card payment service. The above-described application may be an applet when a program of the secure element 120 is written in the Java language; however, other applications may be written in other languages.

A data communication method of the electronic device 100 according to an embodiment may include, by performing mutual authentication between the application processor 110 and the secure element 120, setting up a secure channel 130 and performing data communication between the application processor 110 and the secure element 120 through the secure channel 130. The application processor 110 or the secure element 120 may be configured to transfer at least one of coupon credential and payment information through the secure channel 130. Although a coupon credential and payment information have been used as examples of types of information that may be transferred between the application processor 110 and the secure element 120, in other embodiments, other types of information may be transmitted.

The secure channel 130 may be set up through mutual authentication between the TEE of the application processor 110 and the secure element 120.

After the secure channel 130 is set up between the application processor 110 and the secure element 120, a verification process for a personal identification number (PIN) may be performed and data communication may be performed.

The application processor 110 and the secure element 120 may be configured to transfer or receive encrypted information between the application processor 110 and the secure element 120 through the secure channel 130.

The secure element 120 may be configured to decrypt and store the encrypted information received from the application processor 110 through the secure channel 130 and store the information in a storage of the secure element 120. The information stored in the storage of the secure element 120 may include at least one of user information, coupon credential, and payment information; however, other types of information may be stored in the storage of the secure element 120.

Figure 2:
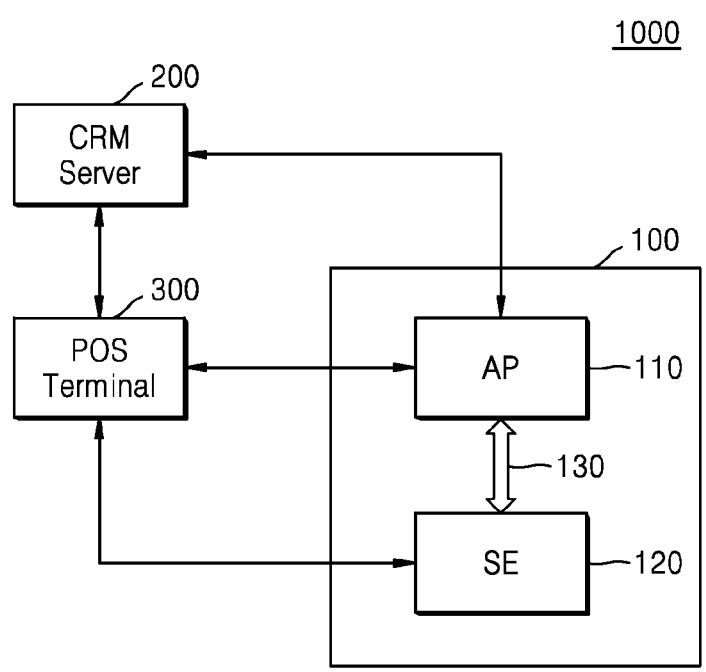
FIG. 2 is a configuration diagram of an electronic system for describing a business model of a coupon and payment service using the electronic device of FIG. 1.

FIG. 2 is a configuration diagram of an electronic system 1000 for describing a business model of a coupon and payment service using the electronic device 100 of FIG. 1. Referring to FIG. 2, the electronic system 1000 may include an electronic device 100, a customer relationship management (CRM) server 200, and a point of sales (POS) terminal 300.

Since a basic operation of the electronic device 100 has been described with reference to FIG. 1, a redundant description thereof will be omitted. The application processor 110 may be configured to manage a coupon application and also manage an application for setting up a secure channel 130 between an application processor 110 and a secure element 120. For example, in an execution environment which is divided into an REE and a TEE of the application processor 110, the secure channel 130 may be set up through mutual authentication between the TEE of the application processor 110 and the secure element 120. Data communication for a coupon service or a payment service may be performed through the secure channel 130.

The CRM server 200 may be a server configured to provide a coupon issuance service and an authentication service. The POS terminal 300 may be a terminal configured to provide a payment service, and may be implemented to be a contact type or a non-contact type.

The electronic device 100, the CRM server 200, and the POS terminal 300 may be configured to transfer and receive data among one another through a wired or wireless communication network. Principal information may be encrypted and transferred among the electronic device 100, the CRM server 200, and the POS terminal 300. Examples of the principal information may include personal information, coupon credential, or payment information. Although communication among the electronic device 100, including the application processor 110 and the secure element 120, the CRM server 200, and the POS terminal 300 have been illustrated as being point to point communications links, any communications network, media, architecture, or the like may be used. For example, the electronic device 100, including the application processor 110 and the secure element 120, the CRM server 200, and the POS terminal 300 may form ad-hoc mesh network. In another example, the electronic device 100, including the application processor 110 and the secure element 120, the CRM server 200, and the POS terminal 300 may each be communicatively coupled to the Internet or other wide area network.

A business model that provides a coupon service and a payment service, according to an embodiment, will be described below.

The application processor 110 of the electronic device 100 may transfer a coupon issuance request to the CRM server 200. The CRM server 200 may transfer an encrypted coupon credential to the application processor 110 of the electronic device 100 in response to the coupon issuance request.

The application processor 110 of the electronic device 100 may determine whether a secure channel 130 is set up between the application processor 110 and the secure element 120 before transferring the encrypted coupon credential received from the CRM server 200 to the secure element 120. When the secure channel 130 is not set up between the application processor 110 and the secure element 120, the secure channel 130 may be set up by performing mutual authentication between the application processor 110 and the secure element 120.

The application processor 110 may transfer the encrypted coupon credential received from the CRM server 200 to the secure element 120 through the secure channel 130. The secure element 120 may decrypt the encrypted coupon credential and store the coupon credential in a storage of the secure element 120.

When payment is to be performed by using a coupon issued by the CRM server 200, the application processor 110 may execute a coupon application and transfer a coupon use request to the POS terminal 300.

The POS terminal 300 may transfer the encrypted coupon credential received from the application processor 110 of the electronic device 100 to the CRM server 200 to request authentication from the CRM server 200.

The CRM server 200 may compare the coupon credential with a coupon issuance record and authenticate the coupon. The CRM server 200 may transfer information on an actual payment amount to the POS terminal. The actual payment amount may be calculated by subtracting a discount amount of the coupon from an original payment amount, setting the actual payment amount to a particular value, or the like.

By executing a payment application stored in the secure element 120 of the electronic device 100, payment in the POS terminal 300 is performed. Therefore, the payment is made for the amount, which may be calculated by subtracting the discount amount of the coupon from a total purchase amount for example, or by another discount technique. For example, the secure element 120 may perform payment by executing various payment types of applications, such as a credit card payment application and a check card payment application.

The CRM server 200 may transfer a coupon update request to the secure element 120 through the POS terminal 300 after payment has been completed. The secure element 120 may perform coupon update processing in response to the coupon update request.

Figure 3:
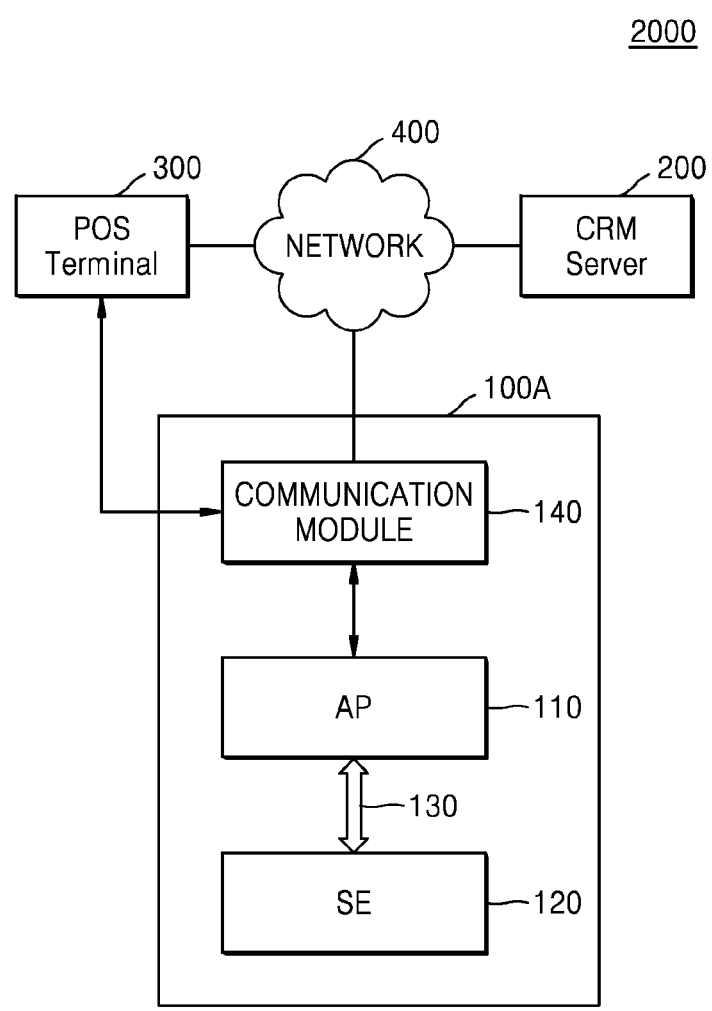
FIG. 3 is a configuration diagram of an electronic system for providing a coupon and payment service using an electronic device, according to an embodiment.

FIG. 3 is a configuration diagram of an electronic system 2000 for providing a coupon and payment service, according to an embodiment.

Referring to FIG. 3, the electronic system 2000 may include an electronic device 100A, a CRM server 200, a POS terminal 300, and a network 400.

The electronic device 100A may include an application processor 110, a secure element 120, and a communication module 140.

The application processor 110 may be configured to control overall operation of the electronic device 100A, control signal flows between internal components of the electronic device 100A, and perform data processing.

Specifically, the application processor 110 may be configured to control hardware or software of the electronic device 100A by executing an operating system or applications, and execute various types of data processing and operations. The application processor 110 may be configured to manage data links for communication with the CRM server 200 or the POS terminal 300 connected to the electronic device 100A through the network 400 and perform conversion of a communication protocol.

For example, the application processor 110 may be configured to manage a coupon application or a payment application, and manage an application for setting up a secure channel 130 between the application processor 110 and the secure element 120. Alternatively, the secure element 120 may manage a payment application.

Since basic operations of the application processor 110 and the secure element 120 have been described with reference to FIGS. 1 and 2, a redundant description thereof will be omitted.

The communication module 140 may be configured to process a signal received from the CRM server 200 and the POS terminal 300 through the network 400 and transfer the signal to the application processor 110. In addition, the communication module 140 may process a signal received from the application processor 110 and transfer the signal to the CRM server 200 and the POS terminal 300 through the network 400.

For example, the communication module 140 may include hardware and software for supporting a wired communication service or a wireless communication service. Specifically, the communication module 140 may include hardware and software for supporting various communication services, such as a mobile communication module, a short range communication module (for example, Wi-Fi), a Bluetooth communication module, or a near field communication (NFC) module.

The network 400 may include a wired communication network, a wireless communication network, or a combination of two or more of such networks. Data communication may be performed among the electronic device 100A, the CRM server 200, and the POS terminal 300 through the network 400.

The CRM server 200 may include hardware and software for providing a coupon issuance service and an authentication service to the electronic device 100A or the POS terminal 300 connected thereto through the network 400. The POS terminal 300 may include hardware and software for providing a coupon use service and a payment service to the CRM server 200 or the electronic device 100A connected thereto through the network 400.

Data processing of performing a coupon and payment service in the electronic system 2000 will be described below.

The application processor 110 of the electronic device 100A may generate and transfer a coupon download request message to the communication module 140 by executing a coupon application. The communication module 140 may connect to the CRM server 200 through the network 400 and transfer the coupon download request message to the CRM server 200. The CRM server 200 may transfer encrypted coupon credential to the electronic device 100A, in response to the coupon download request message.

The communication module 140 of the electronic device 100A may receive the encrypted coupon credential from the CRM server 200, perform signal processing on the encrypted coupon credential in compliance with a communication standard, and transfer the encrypted coupon credential to the application processor 110.

The application processor 110 of the electronic device 100A may determine whether a secure channel 130 is set up between the application processor 110 and the secure element 120 before transferring the encrypted coupon credential to the secure element 120. When the secure channel 130 is not set up between the application processor 110 and the secure element 120, the secure channel 130 may be set up by performing mutual authentication between the application processor 110 and the secure element 120. In this case, each of the application processor 110 and the secure element 120 may execute an authentication application and perform authentication processing.

After the secure channel 130 is set up, a verification process for a PIN may be performed between the application processor 110 and the secure element 120.

After the PIN has been verified, the application processor 110 may transfer the encrypted coupon credential to the secure element 120 through the secure channel 130. The secure element 120 may decrypt the encrypted coupon credential and store the coupon credential in a storage of the secure element 120.

In this way, the coupon credential issued by the CRM server 200 may be stored in the secure element 120 of the electronic device 100A.

When payment is to be performed by using the coupon credential stored in the secure element 120, use of the coupon credential may be requested through the POS terminal 300. The POS terminal 300 may request the electronic device 100A connected to the network 400 to transfer the coupon credential thereto. Data communication may be performed between the POS terminal 300 and the electronic device 100A by using an NFC module.

For example, data communication may be performed between the POS terminal 300 and the application processor 110 of the electronic device 100A by using an NFC module. In another example, data communication may be performed between the POS terminal 300 and the secure element 120 of the electronic device 100A by using an NFC module. In some embodiments, the NFC module may be part of the communication module 140; however, in other embodiments, the NFC module may be as separate component of the electronic device 100A or part of another component of the electronic device 100A.

The POS terminal 300 may request the application processor 110 of the electronic device 100A to transfer the coupon credential by using the NFC module included in the communication module 140. The application processor 110 may receive the encrypted coupon credential from the secure element 120 through the secure channel 130 and transfer the encrypted coupon credential to the POS terminal 300 through the communication module 140.

Alternatively, the POS terminal 300 may directly request the secure element 120 of the electronic device 100A to transfer the coupon credential by using the NFC module included in the communication module 140. The secure element 120 may perform encryption processing on the requested coupon credential and transfer the coupon credential to the POS terminal 300 through the NFC module included in the communication module 140. In this case, it may be unnecessary to pass through the application processor 110.

The POS terminal 300 may transfer the encrypted coupon credential received from the electronic device 100A to the CRM server 200 connected to the network 400 to request authentication and financial discount.

The CRM server 200 may compare the coupon credential with a coupon issuance record and authenticate the coupon. The CRM server 200 may transfer information on an actual payment amount to the POS terminal 300, the actual payment amount being calculated, for example, by subtracting a discount amount of the coupon from a total payment amount.

By executing a payment application stored in the secure element 120 of the electronic device 100, payment is performed by data communication with the POS terminal through the communication module 140. Therefore, payment is made for the amount of memory which is calculated, for example, by subtracting the discount amount of the coupon from a total purchase amount. The secure element 120 may perform payment by executing various payment types of applications, such as a credit card payment application and a check card payment application.

The CRM server 200 may transfer a coupon update request to the electronic device 100A through the POS terminal 300 after payment has been completed. The application processor 110 of the electronic device 100A may transfer the coupon update request received through the communication module 140 to the secure element 120 through the secure channel 130. Therefore, the secure element 120 may perform coupon update processing in response to the received coupon update request.

Figure 4:
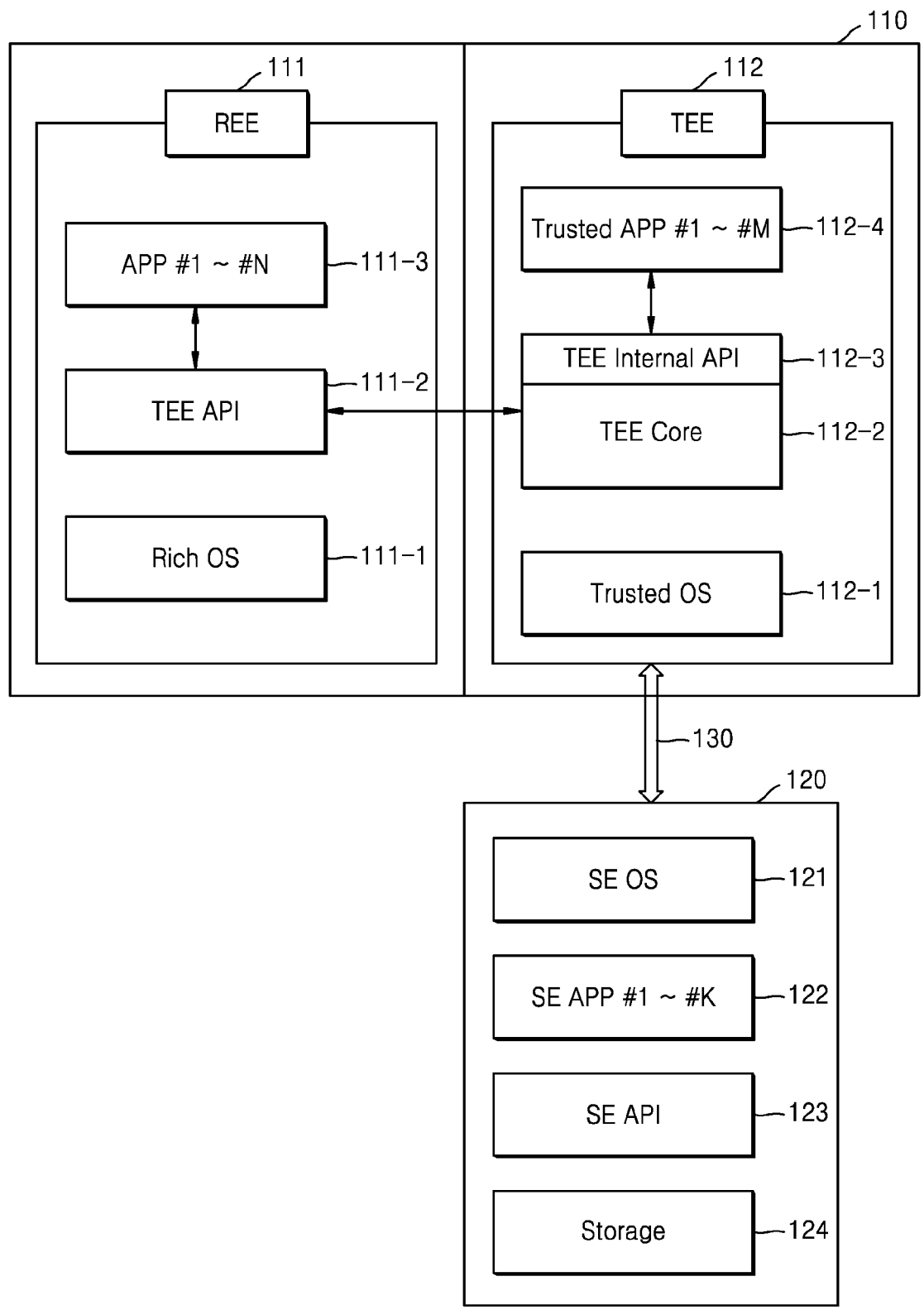
FIG. 4 is a block diagram of a configuration of an application processor and a secure element illustrated in FIG. 1, according to an embodiment.

FIG. 4 is a block diagram of a configuration of the application processor 110 and the secure element 120 illustrated in FIG. 1, according to an embodiment.

Referring to FIG. 4, the application processor 110 may have an REE 111 and a TEE 112.

The REE 111 is a non-secure execution environment and may include a rich operating system (rich OS) 111-1, a trusted execution environment application program interface (TEE API) 111-2, and multiple applications (APPs) #1 to # N 111-3. The TEE 112 is a secure execution environment and may include a trusted operating system (trusted OS) 112-1, a TEE core 112-2, a TEE internal API 112-3, and multiple trusted applications (APPs) #1 to # M 112-4.

The rich OS 111-1 may be configured to control hardware and software in the REE 111 that is a non-secure execution environment. Specifically, the rich OS 111-1 may be configured to control hardware and software so as to allow the APPs #1 to # N 111-3 to be efficiently executed by the REE 111.

The APPs #1 to # N 111-3 may include an application for performing a coupon service and a payment service in the REE 111. For example, the APPs #1 to # N 111-3 may include one or more applications which execute tasks for providing a coupon service and a payment service in the REE 111, among tasks included in flowcharts of FIGS. 6 to 14.

The TEE API 111-2 may be an interface which controls or manages resources used to execute the APPs #1 to # N 111-3. When it is necessary to exchange information with the TEE 112 upon execution of the APPs #1 to # N 111-3, information exchange with the TEE 112 may be performed through the TEE API 111-2 having a secure execution environment function. Therefore, it is hard to access the TEE 112 without passing through the TEE API 111-2.

The trusted OS 112-1 may be configured to control hardware and software in the TEE 112 that is a secure execution environment. Specifically, the trusted OS 112-1 may be configured to control hardware and software so as to allow the trusted APPs #1 to # M 112-4 to be efficiently executed by the TEE 112.

The trusted APPs #1 to # M 112-4 may include an application to perform a coupon service and a payment service in the TEE 112. The trusted APPs #1 to # M 112-4 may include an application for performing mutual authentication with the secure element 120 in order to set up a secure channel between the TEE 12 and the secure element 120.

For example, the trusted APPs #1 to # M 112-4 may include one or more applications which execute tasks for providing a coupon service and a payment service in the TEE 112, among tasks included in the flowcharts of FIGS. 6 to 14.

The TEE core 112-2 is hardware and software which execute the trusted OS 112-1 and the trusted APPs #1 to # M 112-4 in the TEE 112. When it is necessary to exchange information with the REE 111 upon execution of the trusted APPs #1 to # M 112-4, the TEE core 112-2 may perform information exchange with the REE 111 through the TEE API 111-2 having the secure execution environment function.

The TEE internal API 112-3 is an interface which controls or manages resources used to execute the trusted APPs #1 to # M 112-4 in the TEE 112.

Referring to FIG. 4, the secure element 120 may include a secure element (SE) operating system 121, multiple secure element applications (SE APPs) #1 to # K 122, a secure element application program interface (SE API) 123, and a storage 124.

The SE OS 121 may be configured to control hardware and software in the secure element 120. Specifically, the SE OS 121 may be configured to control hardware and software of the secure element 120 so as to allow the SE APPs #1 to # K 122 to be efficiently executed.

The SE APPs #1 to # K 122 may include an application for performing a coupon service and a payment service in the secure element 120. The SE APPs #1 to # K 122 may include an application for performing mutual authentication with the TEE 112 in order to set up a secure channel between the secure element 120 and the TEE 112.

For example, the SE APPs #1 to # K 122 may include one or more applications configured to execute tasks for providing a coupon service and a payment service in the secure element 120, among tasks included in the flowcharts of FIGS. 6 to 14.

The SE API 123 may be an interface configured to control or manage resources used to execute the SE APPs #1 to # K 122.

The storage 124 may be a non-volatile memory device and may include, for example, a flash memory device. For example, at least one of user information, coupon credential, and payment information may be stored in the storage 124.

When data communication is to be performed between the application processor 110 and the secure element 120, the secure channel 130 may be set up by executing an application for performing mutual authentication between the TEE 112 of the application processor 110 and the secure element 120.

Therefore, it is possible to reduce a chance of or prevent unauthorized data leakage by performing data communication between the TEE 112 of the application processor 110 and the secure element 120 through the secure channel 130. In addition, the TEE 112 may be accessed through the TEE API 111-2 in the REE 111 of the application processor 110, resulting in a lower chance or elimination of unauthorized data leakage.

Figure 5:
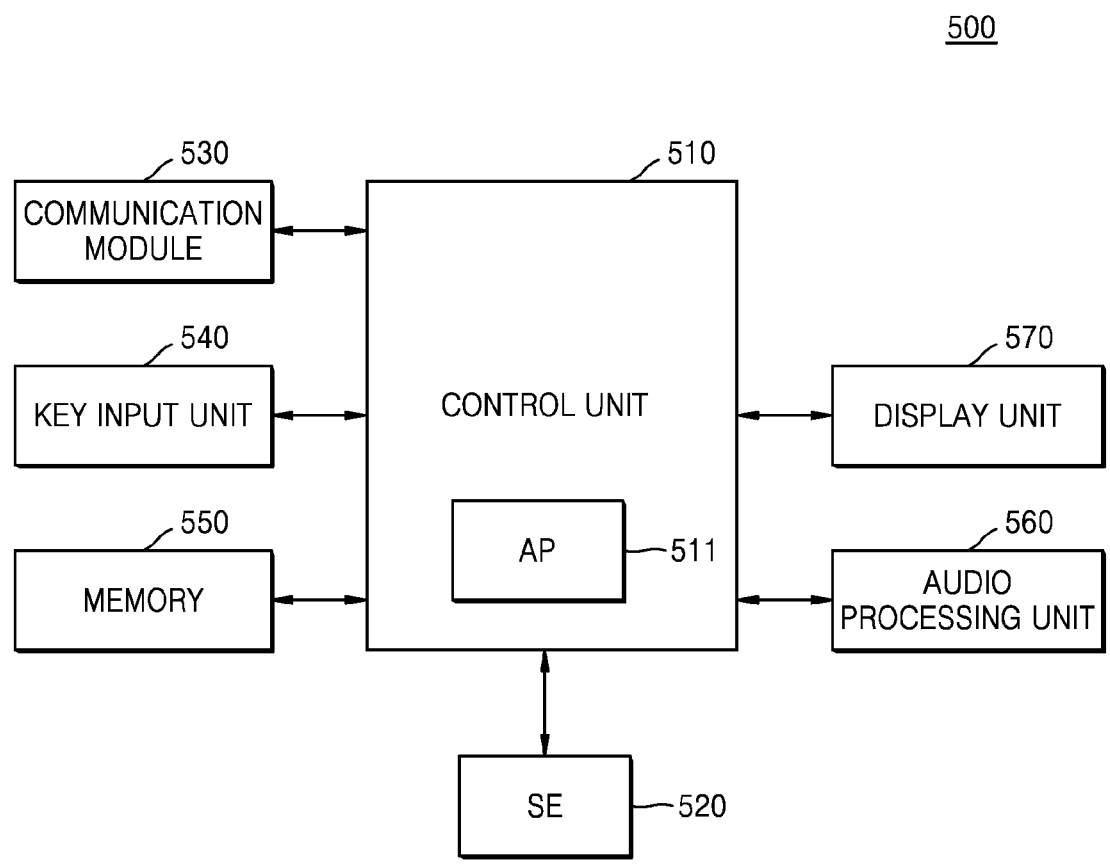
FIG. 5 is a configuration diagram of a mobile device to which a data communication method using a secure element is applicable, according to an embodiment.

FIG. 5 is a configuration diagram of a mobile device 500 to which a data communication method using a secure element is applicable, according to an embodiment.

Referring to FIG. 5, the mobile device 500 may include a control unit 510, a secure element (SE) 520, a communication module 530, a key input unit 540, a memory 550, an audio processing unit 560, and a display unit 570.

The control unit 510 may be configured to control an overall operation of the mobile device 500, control signal flows between components, and process data. For example, the control unit 510 may be configured to control the components of the mobile device 500 so as to provide a voice call service, a video call service, a text message service, or a data communication service through various networks. The control unit 510 may be configured to control hardware and software so as to provide a coupon service and a payment service according to the flowcharts illustrated in FIGS. 6 to 14.

The control unit 510 may include one or more application processors 511. The application processor 110 described with reference to FIGS. 1 to 4 may be used as the one or more application processors 511.

The secure element 120 described with reference to FIGS. 1 to 4 may be used as the secure element 520.

The communication module 530 may include hardware and software for supporting a wired communication service or a wireless communication service. Specifically, the communication module 530 may include hardware and software for supporting various communication services, such as a mobile communication service, a mobile communication module, a short range communication module (for example, Wi-Fi), a Bluetooth communication module, and/or a NFC module.

The key input unit 540 may include one or more touch keys. Such a touch key refers to various types of input devices capable of recognizing a touch or approach of a human body part or object, such as a button, touchscreen, switch, or the like. The key input unit 540 may be used as an input device for a coupon service. For example, a user may input a PIN or input coupon selection through the key input unit 540 during a coupon service.

The memory 550 may include a main memory and a secondary memory. For example, the main memory may include random access memory (RAM). The secondary memory may include read only memory (ROM) or a non-volatile memory, such as a flash memory. Various types of programs, for example, a booting program, an operating system, and applications may be stored in the secondary memory. Specifically, the secondary memory may include a rich operating system (rich OS) and a trusted operating system (trusted OS). Applications necessary to provide the coupon service according to the flowcharts illustrated in FIGS. 6 to 14 may be stored in the secondary memory. The control unit 510 may be configured to read and load the booting program, the operating system, and the applications from the secondary memory and into the main memory.

Therefore, the application processor 511 of the control unit 510 may be configured to control hardware and software of the mobile device 500 by using the programs loaded into the main memory.

For example, circuit design may be made such that all or part of the memory 550 is included in the control unit 510. Alternatively, circuit design may be made such that all or part of the memory 550 is included in the application processor 511 of the control unit 510. All or part of hardware of the mobile device 500, including the control unit 510, may be integrated into a single chip as a system on chip (SoC).

The audio processing unit 560 may be configured to perform audio signal processing so as to provide a call service. The display unit 570 may be a device configured to output image data processed by the control unit 510. Examples of the display unit 570 may include a liquid crystal display (LCD) and an organic light-emitting diode (OLED) display.

Although not illustrated in FIG. 5, the mobile device 500 may further include ports capable of communicating with a memory card, a USB device, or other electronic devices. In addition, the mobile device 500 may further include a camera or a sensor.

In some embodiments, one or more of the control unit 510, secure element (SE) 520, communication module 530, key input unit 540, memory 550, audio processing unit 560, and display unit 570 may be combined. For example, the key input unit 540 and the display unit 570 may be combined into a touchscreen.

A data communication method using a secure element according to an embodiment will be described with reference to the flowcharts of FIGS. 6 to 9.

For example, methods of the flowcharts of FIGS. 6 to 9 may be performed by the electronic device 100 illustrated in FIGS. 1 to 4 or the mobile device 500 illustrated in FIG. 5. The data communication method using a secure element, as illustrated in the flowcharts of FIGS. 6 to 9, may be performed in various types of devices, including a secure element, as well as the electronic device 100 or the mobile device 500 illustrated in FIGS. 1 to 5.

For convenience of description, the flowcharts of FIGS. 6 to 9 will be described with reference to the electronic device 100 illustrated in FIGS. 1 to 4.

Figure 6:
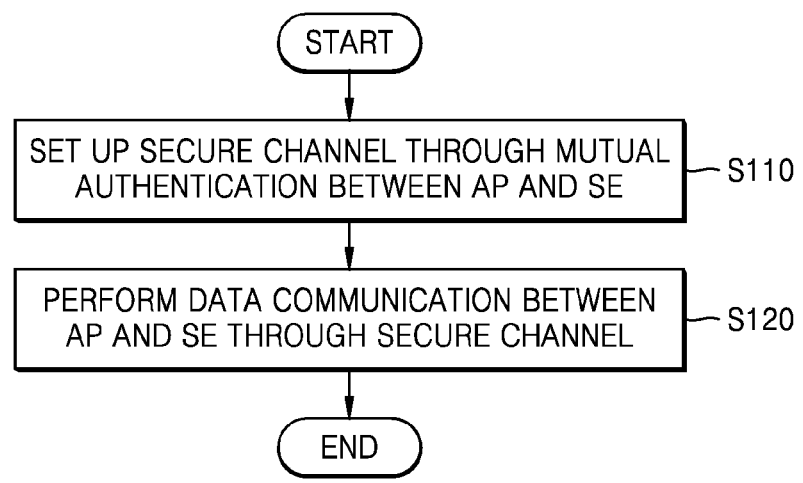
FIG. 6 is a flowchart of a data communication method using a secure element, according to an embodiment.

FIG. 6 is a flowchart of a data communication method using a secure element 120, according to an embodiment. Referring to FIGS. 1 and 6, in operation S110, the electronic device 100 including the secure element 120 may set up a secure channel 130 through mutual authentication between the application processor 110 and the secure element 120. For example, the secure channel 130 may be set up through mutual authentication between the TEE of the application processor 110 and the secure element 120. For example, the application processor 110 and the secure element 120 may exchange certificate information with each other, and perform a mutual authentication process between the application processor 110 and the secure element 120 by using a public key and a secret key. The mutual authentication process that sets up the secure channel 130 will be described with reference to FIG. 10.

In operation S120, the electronic device 100 may perform data communication between the application processor 110 and the secure element 120 through the secure channel 130 set up in operation S110. For example, the data communication may include data communication related to at least one of a coupon issuance process, a coupon storage process, a coupon use process, and a coupon update process. For example, encrypted data may be transferred and received between the application processor 110 and the secure element 120 through the secure channel 130.

Figure 7:
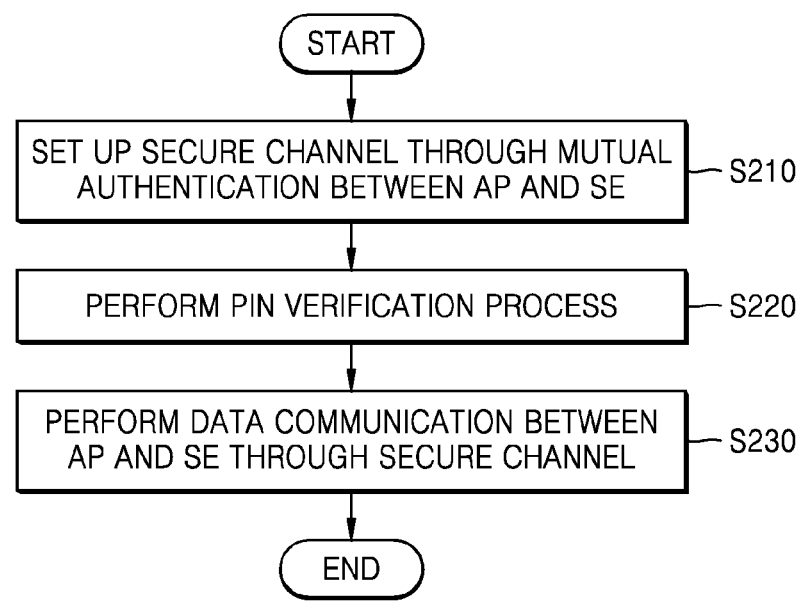
FIG. 7 is a flowchart of a data communication method using a secure element, according to another embodiment.

FIG. 7 is a flowchart of a data communication method using a secure element 120, according to another embodiment. Referring to FIGS. 1 and 7, in operation S210, the electronic device 100 including the secure element 120 may set up the secure channel 130 through mutual authentication between the application processor 110 and the secure element 120. Setting up of the secure channel in S210 may be similar to that of S110 described above.

In operation S220, the electronic device 100 may perform a PIN verification process after the secure channel 130 is set up between the application processor 110 and the secure element 120. For example, the application processor 110 may request the secure element 120 to verify the PIN through the secure channel 130. The secure element 120 may verify the PIN received from the application processor 110 and transfer a verification result to the application processor 110.

In operation S230, when verification for the PIN succeeds, the electronic device 100 may perform data communication between the application processor 110 and the secure element 120 through the secure channel 130. However, if the verification of the PIN in S220 is not successful, further communication may not be performed through the secure channel.

Figure 8:
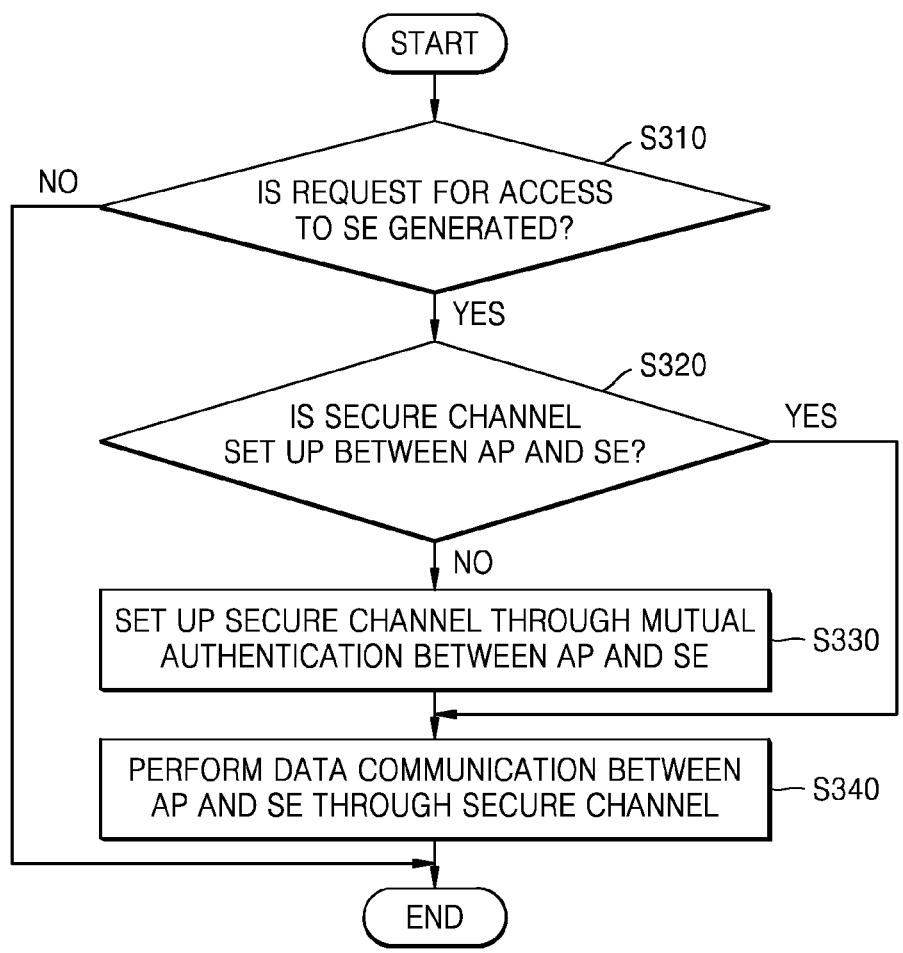
FIG. 8 is a flowchart of a data communication method using a secure element, according to another embodiment.

FIG. 8 is a flowchart of a data communication method using a secure element 120, according to another embodiment. Referring to FIGS. 1 and 8, in operation S310, the electronic device 100 may determine whether a request for access to the secure element 120 is generated. Specifically, the application processor 110 of the electronic device 100 may determine whether the request for access to the secure element 120 is generated. For example, the request for access to the secure element 120 may be generated in order to receive a coupon service or a payment service.

In operation S320, if it is determined in operation S310 that the request for access to the secure element 120 is generated, the electronic device 100 may determine whether the secure channel 130 is set up between the application processor 110 and the secure element 120. Specifically, the application processor 110 of the electronic device 100 may determine whether the secure channel 130 is set up between the application processor 110 and the secure element 120.

In operation S330, if it is determined in operation S320 that the secure channel 130 is not set up between the application processor 110 and the secure element 120, the electronic device 100 may set up the secure channel 130 through mutual authentication between the application processor 110 and the secure element 120.

In operation S340, the electronic device 100 may perform data communication between the application processor 110 and the secure element 120 through the secure channel 130.

If it is determined in operation S320 that the secure channel 130 is set up between the application processor 110 and the secure element 120, operation S330 may be skipped and operation S340 is performed. However, in some embodiments, another secure channel may be set up between the application processor 110 and the secure element 120 and the communication between the application processor 110 and the secure element 120 may be performed through that secure channel.

Figure 9:
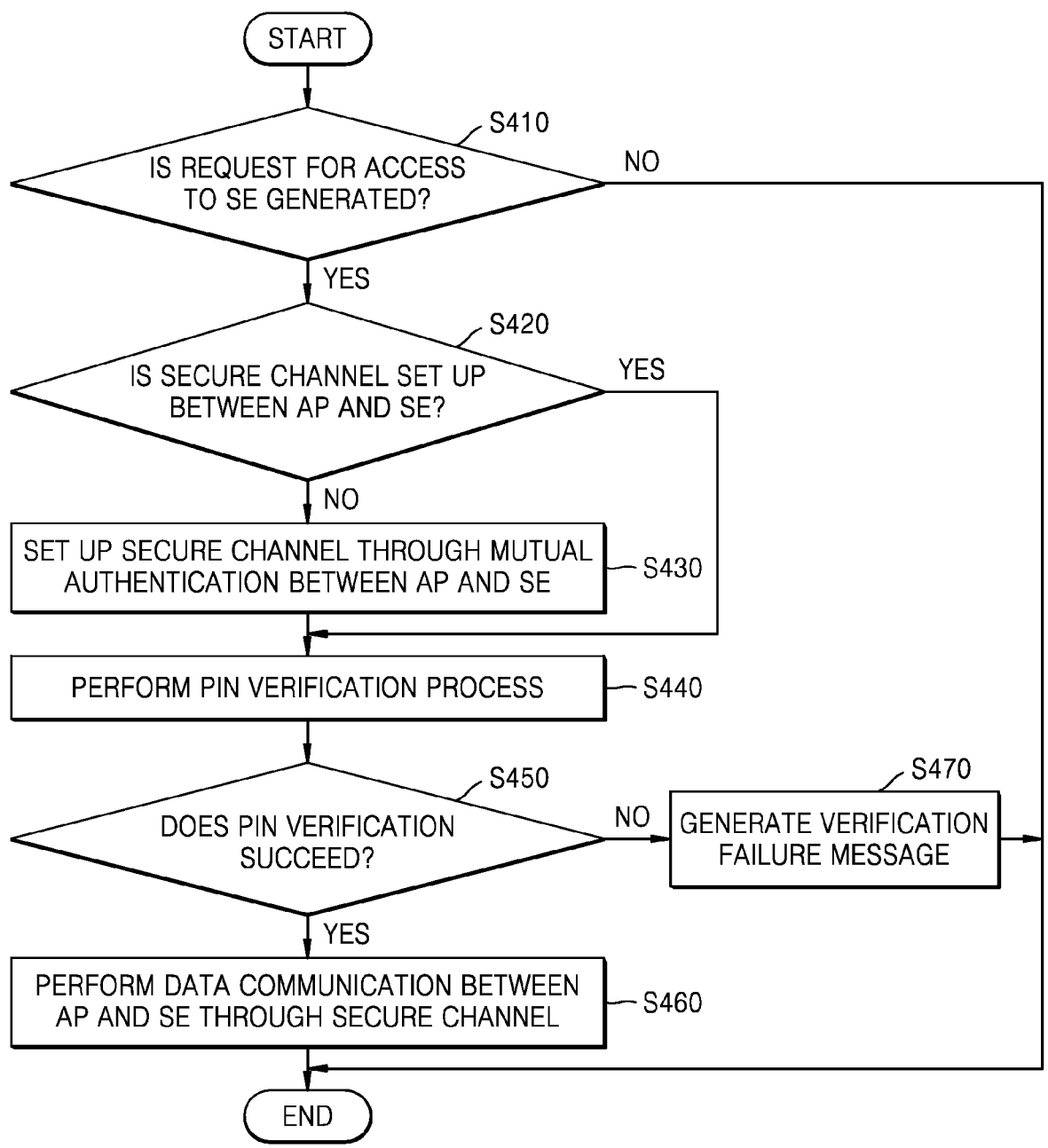
FIG. 9 is a flowchart of a data communication method using a secure element, according to another embodiment.

FIG. 9 is a flowchart of a data communication method using a secure element 120, according to another embodiment. Referring to FIGS. 1 and 9, in operation S410, the electronic device 100 may determine whether a request for access to the secure element 120 is generated.

In operation S420, if it is determined in operation S410 that the request for access to the secure element 120 is generated, the electronic device 100 may determine whether a secure channel 130 is set up between the application processor 110 and the secure element 120.

In operation S430, if it is determined in operation S420 that the secure channel 130 is not set up between the application processor 110 and the secure element 120, the electronic device 100 may set up the secure channel 130 through mutual authentication between the application processor 110 and the secure element 120. Operations S410, S420, and S430 may be similar to operations S310, S320, and S330 described above.

In operation S440, the electronic device 100 may perform a PIN verification process after the secure channel 130 is set up between the application processor 110 and the secure element 120.

If it is determined in operation S420 that the secure channel 130 is set up between the application processor 110 and the secure element 120, operation S430 is skipped and operation S440 is performed.

In operation S450, the electronic device 100 may determine whether the verification for the PIN succeeds. For example, when the application processor 110 requests the secure element to verify the PIN, the secure element 120 may verify the PIN received from the application processor 110 and determine whether the verification for the PIN succeeds.

In operation S460, if it is determined in operation S450 that the verification for the PIN succeeds, the electronic device 100 may perform data communication between the application processor 110 and the secure element 120 through the secure channel 130.

In operation S470, if it is determined in operation S450 that the verification for the PIN fails, the electronic device 100 may generate a verification failure message. For example, the verification failure message may be output through a display unit (not illustrated) of the electronic device 100. In some embodiments, the data communication in S460 is not performed.

Figure 10:
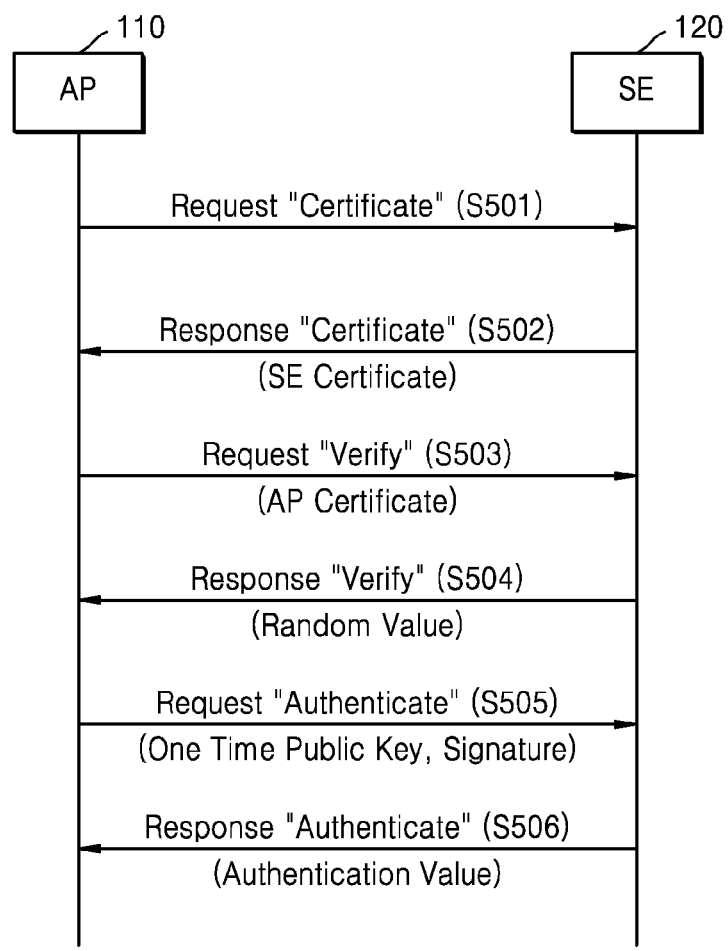
FIG. 10 is a flowchart of a process of setting up a secure channel between an application processor and a secure element in the electronic device of FIG. 1, according to an embodiment.

FIG. 10 is a flowchart of a process of setting up the secure channel 130 between the application processor 110 and the secure element 120 in the electronic device 100 of FIG. 1, according to an embodiment. Referring to FIGS. 1 and 10, in operation S501, the application processor 110 may transfer a certificate information request to the secure element 120. In operation S502, the secure element 120 may transfer certificate information of the secure element 120 (SE Certificate) to the application processor 110 in response to the certificate information request.

In operation S503, the application processor 110 may transfer, to the secure element 120, a verify request message along with certificate information of the application processor 110 (AP Certificate). Accordingly, the application processor may transfer the AP certificate to the secure element 120. The secure element 120 may verify the certificate information of the application processor 110 by, for example, using a public key of the certificate information of the application processor 110 and generate a random value. In operation S504, the secure element 120 may transfer the random value to the application processor 110 in response to the verify request message.

In operation S505, the application processor 110 may generate signature information and a public key (for example, a one-time public key) by using the received random value and transfer, to the secure element 120, an authenticate request message along with the generated signature information and the generated public key.

The secure element 120 may verify the signature information by using the public key of the application processor 110. The secure element 120 may derive an authentication value by using the public key of the application processor 110 and a secret key of the secure element 120.

In operation S506, the secure element 120 may transfer the derived authentication value to the application processor 110 in response to the authenticate request message. The application processor 110 may authenticate the authentication value by using a public key of the secure element 120 and a secret key of the application processor 110.

When mutual authentication between the application processor 110 and the secure element 120 succeeds, the secure channel 130 may be set up.

Although a particular technique of setting up a secure channel 130 between the application processor 110 and the secure element 120 has been used as an example, in other embodiments, other techniques of end-to-end encryption between the application processor 110 and the secure element 120 may be used to set up the secure channel 130. Furthermore, one or both of the application processor 110 and the secure element 120 may support different forms of encryption.

A coupon issuance process, a coupon redemption process, and a payment process using a coupon in the electronic system 1000 illustrated in FIG. 2 will be described with reference to the flowcharts of FIGS. 11 to 14. As described above, the application processor 110 and the secure element 120 of the electronic device 100, which is included in the electronic system 1000, may have substantially the same configuration as illustrated in FIG. 4. Therefore, an execution environment of the application processor 110 may be divided into an REE 111 and a TEE 112.

A process of performing a coupon service and a payment service among the CRM server 200, the POS terminal 300, the REE 111 and the TEE 112 of the application processor 110 of the electronic device 100, and the secure element 120 will be described below.

Figure 11:
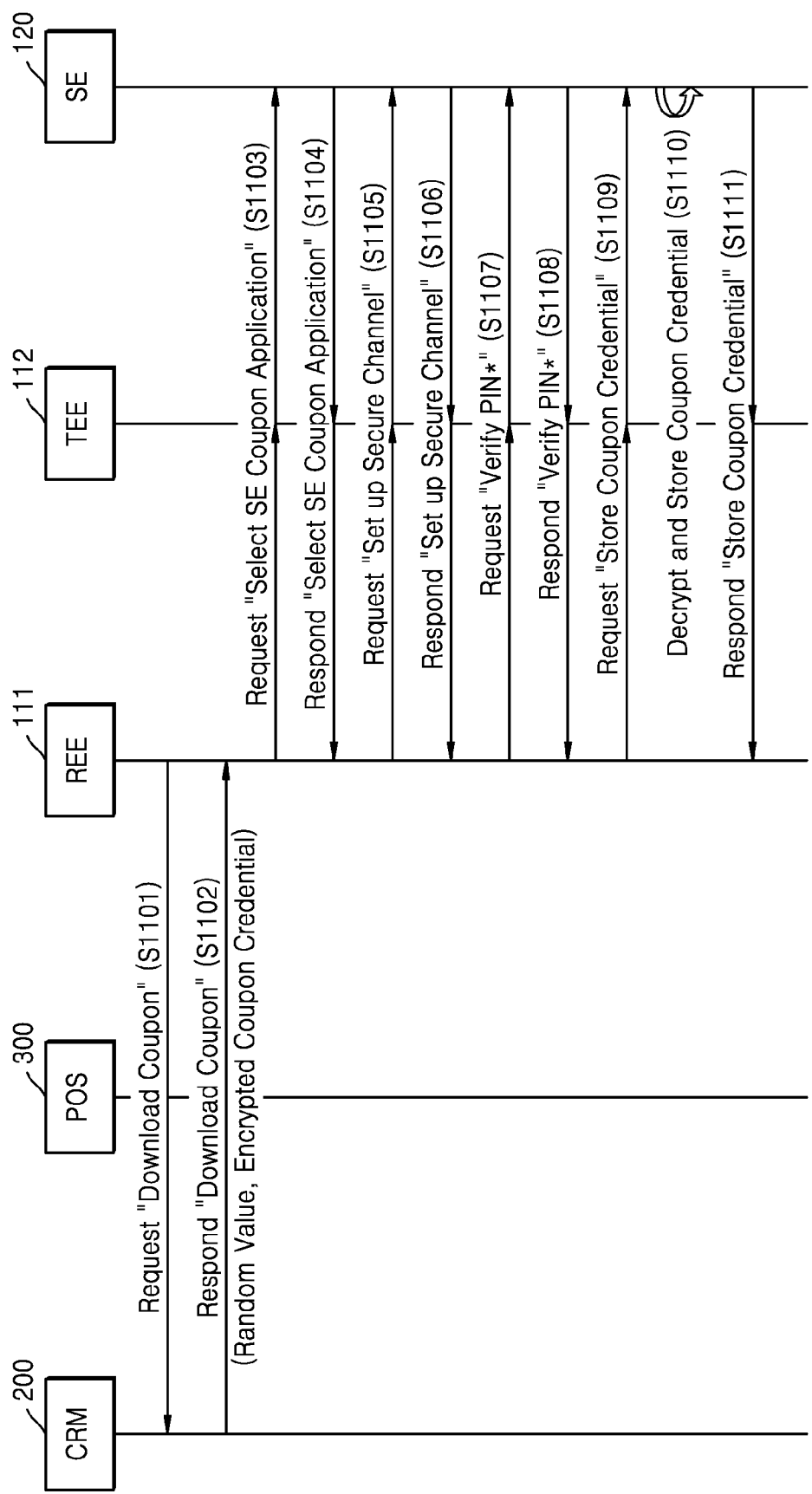
FIG. 11 is a flowchart of a coupon issuance process in the electronic system illustrated in FIG. 2, according to an embodiment.

FIG. 11 is a flowchart of a coupon issuance process in the electronic system 1000 illustrated in FIG. 2, according to an embodiment. Referring to FIGS. 2, 4, and 11, in operation S1101, the REE 111 of the application processor 110 may transfer a coupon download request to the CRM server 200. In operation S1102, the CRM server 200 may transfer encrypted coupon credential to the REE 111 of the application processor 110 in response to the coupon download request from the electronic device 100. For example, the CRM server 200 may transfer a random value along with the encrypted coupon credential to the REE 111 of the application processor 110.

In operation S1103, the REE 111 of the application processor 110 may transfer an SE coupon application select request to the secure element 120 through the TEE 112. The secure element 120 may select and execute an SE coupon application. In operation S1104, the secure element 120 may transfer response information to the REE 111 through the TEE 112 in response to the SE coupon application select request.

In operation S1105, the REE 111 of the application processor 110 may transfer a secure channel set up request to the secure element 120 through the TEE 112.

In operation S1106, the secure channel may be set up through mutual authentication between the TEE 112 of the application processor 110 and the secure element 120. In operation S1106, the SE 120 may transfer response information to the REE 111 through the TEE 112 in response to the secure channel set up request.

For example, the process of setting up the secure channel in operations S1105 and S1106 may be performed through the process as in FIG. 10.

In operation S1107, the REE 111 of the application processor 110 may transfer a PIN verify request to the secure element 120 through the TEE 112. In operation S1108, the secure element 120 may verify the PIN and transfer a verification result message to the REE 111 through the TEE 112 of the application processor 110.

In operation S1109, the application processor 110 may transfer the encrypted coupon credential received from the CRM server 200 and a store request message to the secure element 120 by passing through the REE 111 and TEE 112. In operation S1110, the secure element 120 may decrypt the encrypted coupon credential and store the coupon credential in a storage of the secure element 120. In operation S1111, the secure element 120 may transfer response information to the REE 111 through the TEE 112 in response to the store request message for the coupon credential.

In this way, the coupon credential issued by the CRM server 200 may be stored in the secure element 120. Although only one coupon credential is used as an example, multiple coupon credentials may be transferred. Furthermore, although only one CRM server 200 is illustrated, the application processor 110 may communicate with multiple CRM servers 200, receive multiple encrypted coupon credentials from the CRM servers 200, and store the associated coupon credentials in the storage of the secure element 120 as described above. In some embodiments, the storage of such coupon credentials may be performed through the same secure channel set up in operations S1105 and S1106, while in other embodiments, different secure channels may be used.

Figure 12:
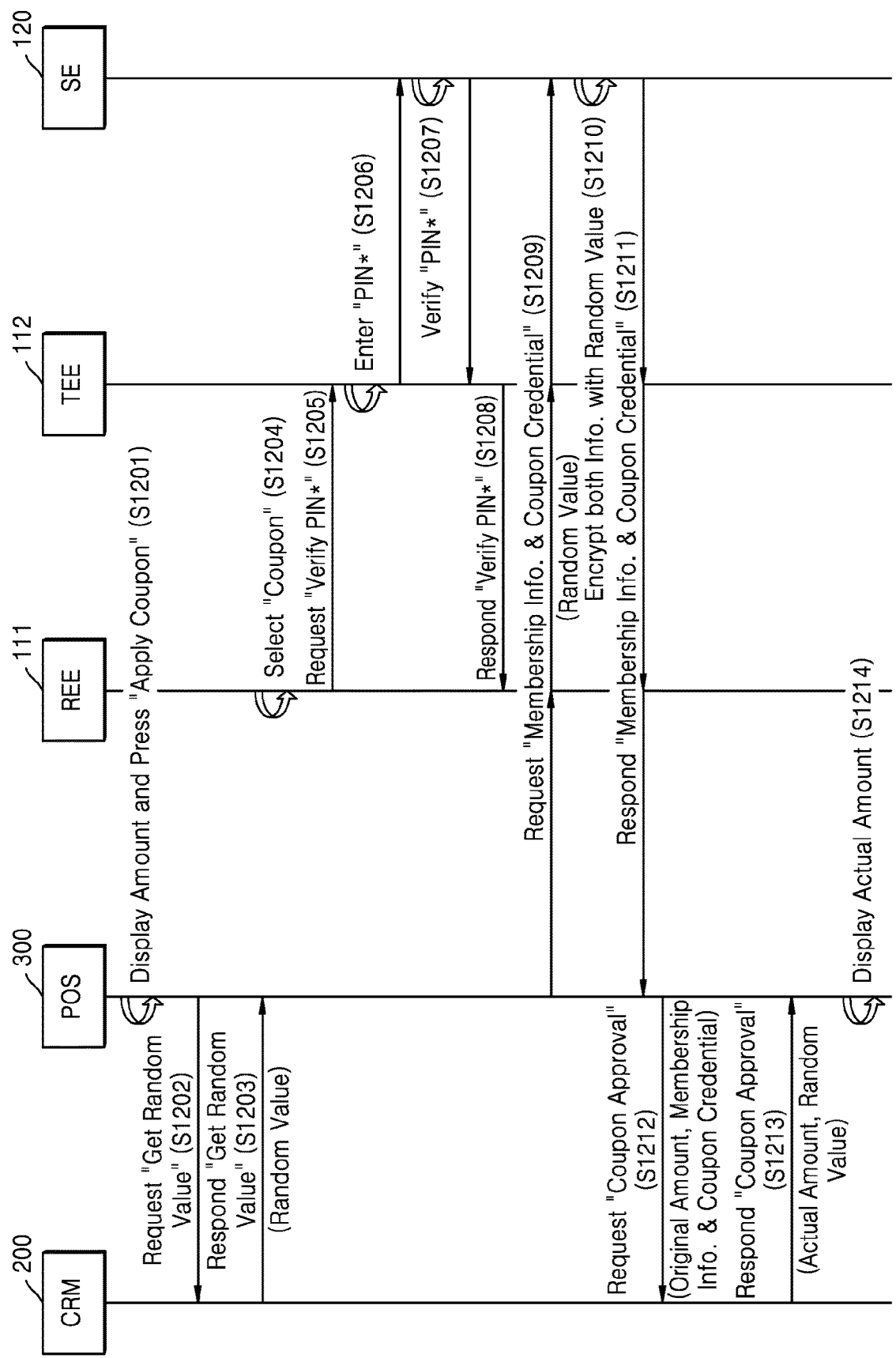
FIG. 12 is a flowchart of a coupon redemption process in the electronic system illustrated in FIG. 2 according to an embodiment.

FIG. 12 is a flowchart of a coupon redemption process in the electronic system 1000 illustrated in FIG. 2, according to an embodiment. Referring to FIGS. 2, 4, and 12, when a coupon to be used is selected through the POS terminal 300 in operation S1201, such as by a user pressing an "Apply Coupon" input, the POS terminal 300 may request a random value from the CRM server 200 in operation S1202. In operation S1203, the CRM server 200 may generate a random value and transfer the random value to the POS terminal 300.

In operation S1204, the application processor 110 may perform processing of selecting a coupon to be used in the REE 111. In operation S1205, when the coupon has been selected, the REE 111 may transfer a PIN verify request to the TEE 112 in the application processor 110. In operation S1206, when a PIN is input to the TEE 112 in response to the PIN verify request, the application processor 110 may transfer a PIN verify request message for the PIN input to the TEE 112 to the secure element 120.

In operation S1207, the secure element 120 may verify the PIN. In operation S1208, the secure element 120 may transfer a verification result message to the REE 111 through the TEE 112.

In operation S1209, the POS terminal 300 may transfer a membership information/coupon credential request message to the secure element 120 through the REE 111 and the TEE 112 of the application processor 110. In this case, the POS terminal 300 may transfer the random value received from the CRM server 200 in operation S1203 to the secure element 120.

In operation S1210, the secure element 120 may read the membership information and the coupon credential from an internal storage and encrypt the membership information and the coupon credential by using the received random value. In operation S1211, the secure element 120 may transfer the encrypted membership information and the encrypted coupon credential to the POS terminal 300 through the TEE 112 and the REE 111 of the application processor 110.

In operation S1212, the POS terminal 300 may transfer a coupon approval request to the CRM server 200. In this case, the POS terminal 300 may transfer, to the CRM server 200, information on an original payment amount along with the encrypted membership information and the encrypted coupon credential.

In operation S1213, the CRM server 200 may transfer response information to the POS terminal 300 in response to the coupon approval request. When coupon approval succeeds, the CRM server 200 may transfer the information on the actual payment amount and the random value to the POS terminal 300. The actual payment amount may be calculated, for example, by subtracting a discount amount of the coupon from the original payment amount.

In operation S1214, the POS terminal 300 may process and display the information on the actual payment amount received from the CRM server 200.

Figure 13:
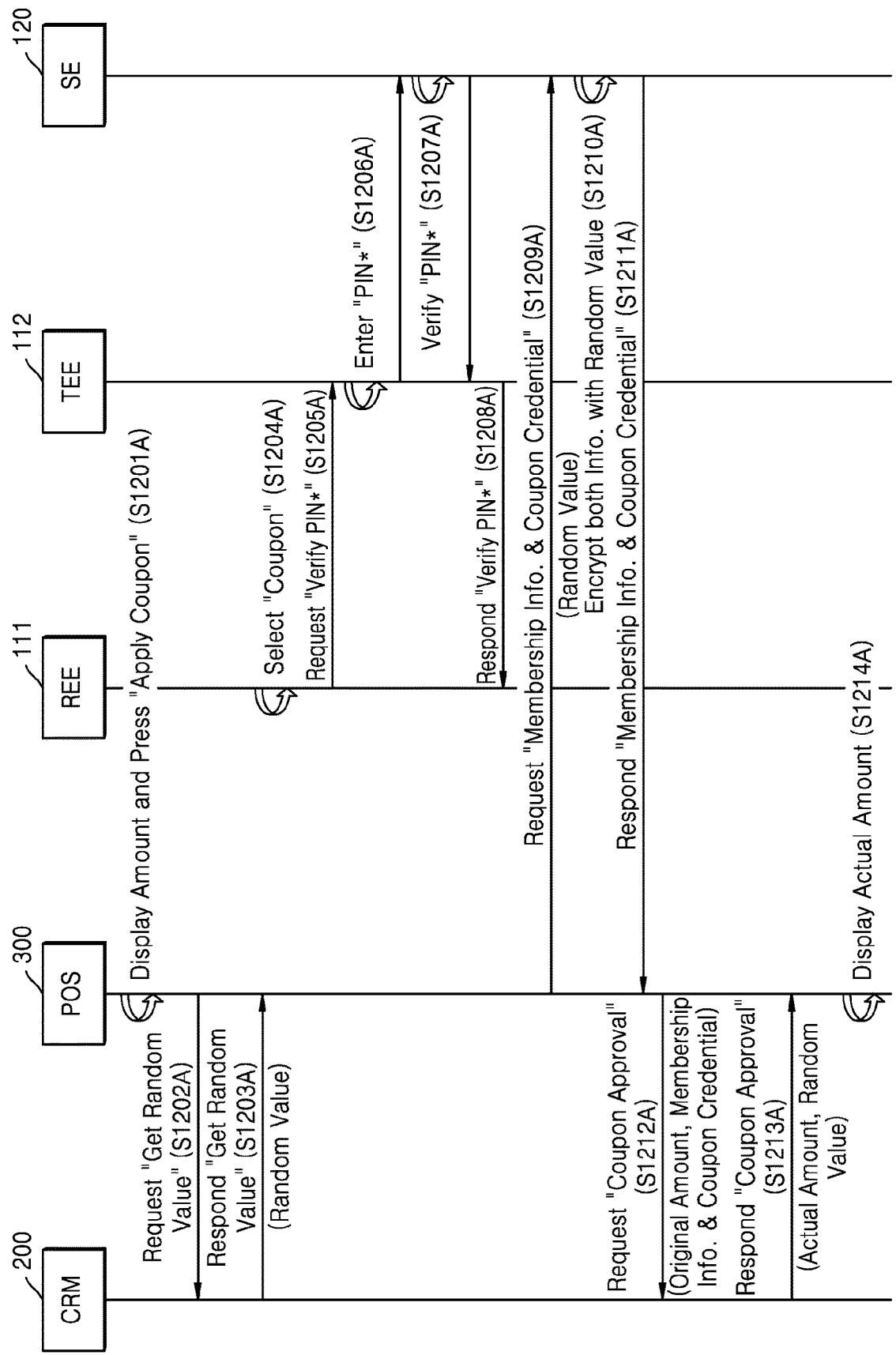
FIG. 13 is a flowchart of a coupon redemption process in the electronic system illustrated in FIG. 2, according to another embodiment.

FIG. 13 is a flowchart of a coupon redemption process in the electronic system 1000 illustrated in FIG. 2 according to another embodiment. Referring to FIGS. 2, 4, and 13, when a coupon to be used is selected through the POS terminal 300 in operation S1201A, the POS terminal 300 may request a random value from the CRM server 200 in operation 51202A. In operation S1203A, the CRM server 200 may generate a random value and transfer the random value to the POS terminal 300.

In operation S1204A, the application processor 110 may perform processing of selecting a coupon to be used in the REE 111. In operation S1205A, when the coupon has been selected, the REE 111 may transfer a PIN verify request to the TEE 112 in the application processor 110. In operation S1206A, when a PIN is input to the TEE 112 in response to the PIN verify request, the application processor 110 may transfer a PIN verify request message for the PIN input to the TEE 112 to the secure element 120.

In operation S1207A, the secure element 120 may verify the PIN. In operation S1208A, the secure element 120 may transfer a verification result message to the REE 111 through the TEE 112.

In operation S1209A, the POS terminal 300 may directly transfer a membership information/coupon credential request message to the secure element 120, not through the REE 111 and the TEE 112 of the application processor 110. In this case, the POS terminal 300 may transfer the random value received from the CRM server 200 in operation S1203A to the secure element 120.

In operation S1210A, the secure element 120 may read membership information and coupon credential from an internal storage and encrypt the membership information and the coupon credential by using the received random value. In operation S1211A, the secure element 120 may directly transfer the encrypted membership information and the encrypted coupon credential to the POS terminal 300, not through the TEE 112 and the REE 111 of the application processor 110. In some embodiments, the application processor 110 may be completely bypassed during the exchange of the request and response related to the membership information and coupon credential.

In operation S1212A, the POS terminal 300 may transfer a coupon approval request to the CRM server 200. In this case, the POS terminal 300 may transfer, to the CRM server 200, information on an original payment amount along with the encrypted membership information and the encrypted coupon credential.

In operation S1213A, the CRM server 200 may transfer response information to the POS terminal 300 in response to the coupon approval request. When coupon approval succeeds, the CRM server 200 may transfer information on an actual payment amount and the random value to the POS terminal 300, the actual payment amount being calculated by subtracting a discount amount of the coupon from the original payment amount.

In operation S1214A, the POS terminal 300 may process and display the information on the actual payment amount received from the CRM server 200.

Figure 14:
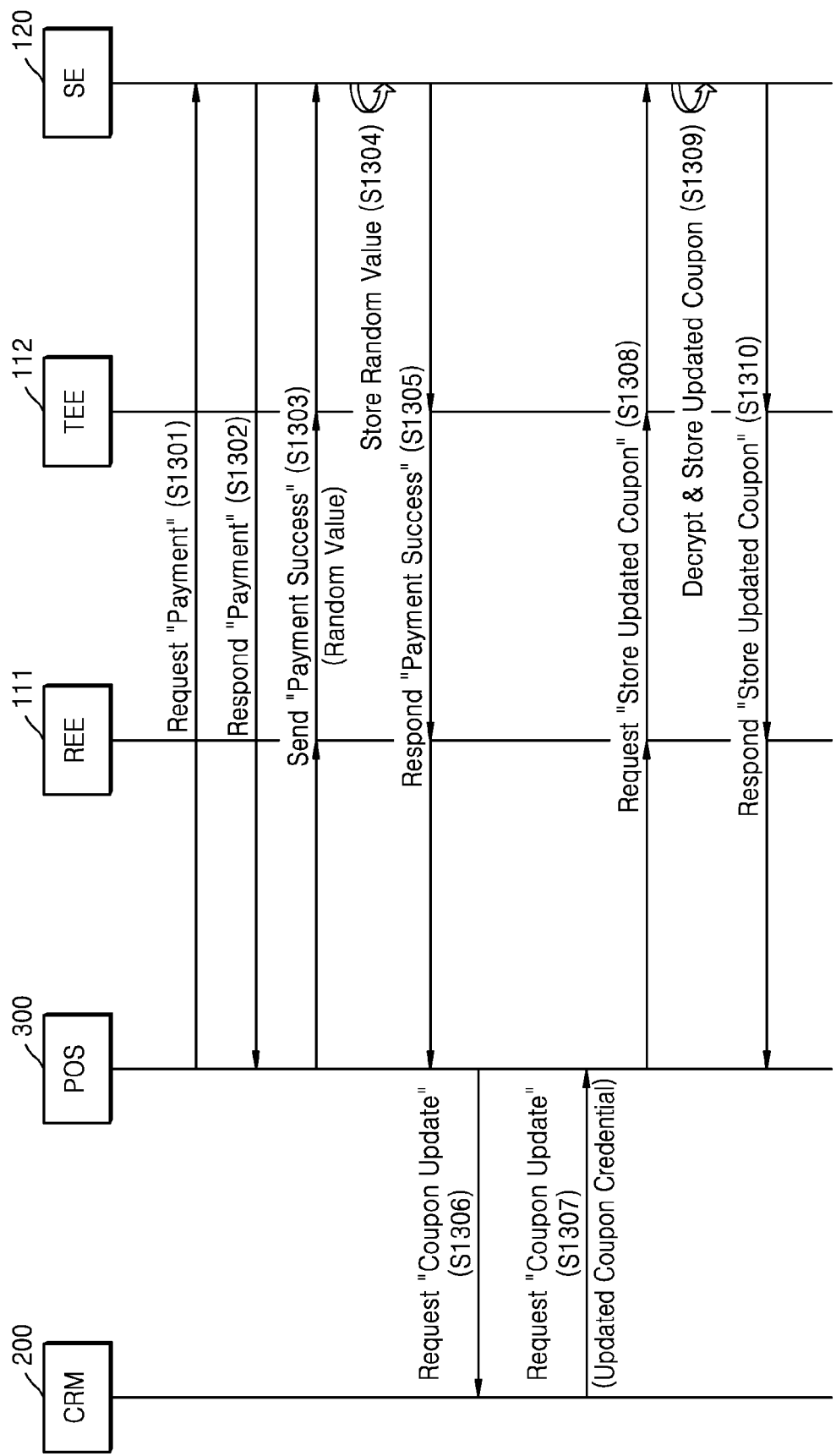
FIG. 14 is a flowchart of a payment process using a coupon in the electronic system illustrated in FIG. 2, according to an embodiment.

FIG. 14 is a flowchart of a payment process using a coupon in the electronic system 1000 illustrated in FIG. 2 according to an embodiment. Referring to FIGS. 2, 4, and 14, in operation S1301, the POS terminal 300 may transfer a payment request to the secure element 120 of the electronic device 100. In this case, a payment amount may correspond to information on the actual payment amount received from the CRM server in operation S1213 of FIG. 12 or operation S1213A of FIG. 13. That is, payment is requested with respect to an amount calculated, for example, by subtracting the discount amount of the coupon from the original payment amount. For example, the POS terminal 300 may directly transfer the payment request to the secure element 120, not through the TEE 112 and the REE 111 of the application processor 110; however, in other embodiments, the POS terminal 300 may transfer the payment request to the secure element 120 through the TEE 112 and the REE 111 of the application processor 110.

In operation S1302, the secure element 120 may execute a payment application and transfer response information to the POS terminal 300 in response to the payment request. For example, the payment application may include various payment types of applications, such as a credit card payment application or a check card payment application.

In operation S1303, the POS terminal 300 may transfer a payment success message and a random value to the secure element 120 through the application processor 110 of the electronic device 100. That is, the POS terminal 300 may transfer the payment success message and the random value to the secure element 120 by passing through the TEE 112 and the REE 111 of the application processor 110.

In operation S1304, the secure element 120 may store the random value received from the POS terminal 300. In operation S1305, the secure element 120 may transfer response information to the POS terminal 300 through the TEE 112 and the REE 111 of the application processor 110 in response to the received payment success message; however, in other embodiments, the transfer may bypass the TEE 112 and the REE 111 of the application processor 110.

In operation S1306, the POS terminal 300 may transfer a coupon update request message to the CRM server 200. In operation S1307, the CRM server 200 may transfer updated coupon credential to the POS terminal 300 in response to the coupon update request message. For reference, the updated coupon credential received by the POS terminal may be encrypted information.

In operation S1308, the POS terminal 300 may transfer a store request message along with the updated coupon credential to the secure element 120 through the application processor 110 of the electronic device 100. That is, the POS terminal 300 may transfer the store request message along with the updated coupon credential to the secure element 120 through the TEE 112 and the REE 111 of the application processor 110.

In operation S1309, the secure element 120 may decrypt the updated coupon credential by using the random value stored in operation S1304 and store the updated coupon credential in an internal storage. In operation S1310, the secure element 120 may transfer response message to the POS terminal 300 through the application processor 110 in response to the store request message for the updated coupon credential. That is, the secure element 120 may transfer the response message to the POS terminal 300 through the TEE 112 and the REE 111 of the application processor 110. In some embodiments, the transfer of the request and response associated with the updated coupon may bypass the TEE 112 and the REE 111 of the application processor 110.

In this way, a process of performing electronic payment using a coupon and coupon update may be performed.

Figure 15:
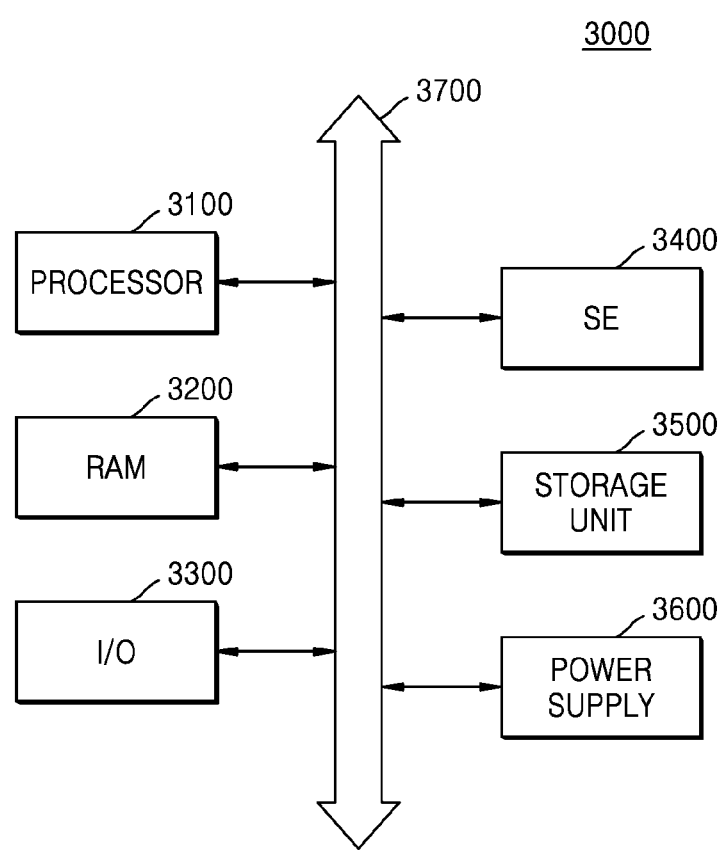
FIG. 15 is a diagram of a configuration of a computing system to which a data communication method using a secure element is applicable, according to an embodiment.

FIG. 15 is a diagram of a configuration of a computing system 3000 to which a data communication method using a secure element is applicable, according to an embodiment.

Referring to FIG. 15, the computing system 3000 may include a processor 3100, RAM 3200, an input/output device 3300, a secure element 3400, a storage unit 3500, a power supply 3600, and a bus 3700. Although not illustrated in FIG. 15, the computing system 3000 may further include ports capable of communicating with a video card, a sound card, a memory card, a USB device, or other electronic devices. The computing system 3000 may include a personal computer, or a portable electronic device, such as a notebook computer, a cellular phone, a PDA, a tablet computer, or a camera.

The processor 3100 may be configured to execute specific calculations or tasks. The application processor 110 illustrated FIGS. 1 to 4 may be used as the processor 3100. According to embodiments, the processor 3100 may be a micro-processor, a central processing unit (CPU), or an application processor. The processor 3100 may communicate with components of the computing system 3000 through the bus 3700, such as an address bus, a control bus, or a data bus.

According to an embodiment, the processor 3100 may be also connected to an expansion bus, such as a peripheral component interconnect (PCI) bus.

The RAM 3200 may be configured to store programs and data used for an operation of the computing system 3000. The various applications which have been described with reference to FIGS. 1 to 4 may be stored in the RAM 3200. As described above, the RAM 3200 may be incorporated in the processor 3100. Examples of the RAM 3200 may include dynamic random access memory (DRAM), mobile DRAM, static random access memory (SRAM), phase-change random access memory (PRAM), ferroelectric random access memory (FRAM), and magnetoresistive random access memory (MRAM).

The input/output device 3300 may include an input device, such as a keyboard, a keypad or a mouse, an output device, such as a printer or a display, and/or an input/output device, such as a touchscreen.

The secure element 3400 may be a platform capable of installing and managing applications. The secure element 3400 may include hardware, software, an interface, and a protocol, which allow execution of applications for security storage, payment, authentication, or various other services. The secure element 120 illustrated in FIGS. 1 to 4 may be used as the secure element 3400.

The storage unit 3500 may be non-volatile storage unit and may be configured to store programs and data necessary for the operation of the computing system 3000. The programs and data stored in the storage unit 3500 may be loaded into the RAM 3200 under the control of the processor 3100.

The power supply 3600 may be configured to supply an operation voltage necessary for the operation of the computing system 3000.

Embodiments may include a method, an apparatus, and/or a system. When executed as software, an embodiment may include code segments that execute operations that cause a processor to perform particular operations. The program or code segments may be stored in a processor-readable medium. Any medium may be used as the processor-readable medium as long as the medium is capable of storing information. Examples of the processor-readable medium may include an electronic circuit, a semiconductor memory device, ROM, a flash memory, erasable ROM (EROM), a floppy disk, an optical disk, and a hard disk.

An embodiment includes a data communication method using a secure element which prevents information leakage through an encrypted channel between a trusted execution environment and the secure element.

An embodiment includes an electronic system adopting a data communication method using a secure element which prevents information leakage through an encrypted channel between a trusted execution environment and the secure element.

An embodiment includes a data communication method including: exchanging certificate information between an application processor of an electronic device and a secure element; setting up a secure channel through mutual authentication between the application processor and the secure element by using a public key and a secret key after the exchange of the certification information; and performing data communication between the application processor and the secure element through the secure channel.

The setting up of the secure channel may include setting up the secure channel through mutual authentication between a trusted execution environment of the application processor and the secure element.

The setting up of the secure channel may include verifying, by the secure element, certificate information of the application processor and generating and transferring a random value to the application processor; generating, by the application processor, signature information and a public key by using the random value and transferring an authenticate request message along with the signature information and the public key; verifying, by the secure element, the signature information by using the public key of the application processor, and transferring an authentication value to the application processor, the authentication value being generated by using the public key of the application processor and a secret key of the secure element; and authenticating, by using the application processor, the authentication value by using a public key of the secure element and a secret key of the application processor.

The performing of the data communication may include transferring or receiving encrypted information between the application processor and the secure element.

The data communication method may further include performing a verification process on a personal identification number (PIN) received from the secure element through the secure channel and performing the data communication after the verification process for the PIN.

The data communication method may further include decrypting the encrypted information received from the application processor in the data communication and storing decrypted information in a storage of the secure element.

The information stored in the storage of the secure element may include at least one of user information, coupon credential, and payment information.

The data communication may include data communication related to at least one of a coupon issuance process, a coupon storage process, a coupon use process, and a coupon update process.

An embodiment includes an electronic system including: a point of sales (POS) terminal that provides a payment service using a communication network; and an electronic device that performs a payment process using coupon credential through data communication with the POS terminal, wherein the electronic device includes: a secure element that stores the coupon credential, user information, and payment information; and an application processor that performs data communication with the secure element for data processing related to a coupon management service and the payment service, wherein the application processor sets up a secure channel through mutual authentication with the secure element and performs the data communication with the secure element through the secure channel.

The secure element may store at least one of a credit card payment application and a check card payment application.

The electronic system may further include a customer relationship management (CRM) server that provides a coupon issuance and authentication service through the communication network, wherein the CRM server may transfer the coupon credential to the electronic device in response to a coupon issuance request message received through the communication network.

The POS terminal may provide a payment service through data communication with the electronic device in a contact manner or a non-contact manner.

The application processor may set up a secure channel between the application processor and the secure element through mutual authentication before transferring encrypted coupon credential received in response to the coupon issuance request message to the secure element.

The secure element may decrypt the encrypted coupon credential received from the application processor through the secure channel and store the decrypted coupon credential.

The electronic device may encrypt and transfer the coupon credential read from the secure element to the POS terminal in response to a coupon credential transfer request received from the POS terminal, and update the coupon credential based on use of the coupon credential in electronic payment.

While embodiments have been particularly shown and described with reference to embodiments thereof, it will be understood that various changes in form and details may be made therein without departing from the spirit and scope of the following claims.

What is claimed is:

1. An electronic system comprising:
   a point of sales (POS) terminal configured to provide a payment service using a communication network; and
   an electronic device configured to perform a payment process using coupon credential through data communication with the POS terminal,
   wherein the electronic device comprises:
   a secure element is at least semi-permanently integrated with the electronic device and configured to execute a secure element operating system, and store the coupon credential, user information, and payment information; and
   an application processor configured to:
      execute both a non-trusted execution environment and trusted execution environment, wherein trusted execution environment provides a cryptographically secure execution environment and includes a trusted operating system,
      in response to a request by a rich execution environment, cause the trusted execution environment to exchange application certificate information and secure element certificate information between the application processor and the secure element, and
      set up a secure channel, via the trusted execution environment, with the secure element, through mutual authentication with the secure element and perform the data communication with the secure element through the secure channel for data processing related to a coupon management service and the payment service; and
   wherein the secure channel is established by:
      receiving, by the application processor, a random value from the secure element;
      generating by the application processor, signature information and a public key using the random value;
      transferring by the application processor, an authenticate request message with the signature information and the public key; and
      verifying, by the secure element, the signature information using the public key of the application processor.

2. The electronic system of claim 1, wherein the secure element is configured to store at least one of a credit card payment application and a check card payment application.

3. The electronic system of claim 1, further comprising a customer relationship management (CRM) server configured to provide a coupon issuance and authentication service through the communication network,
   wherein the CRM server is configured to transfer the coupon credential to the electronic device in response to a coupon issuance request message received through the communication network.

4. The electronic system of claim 1, wherein the POS terminal is configured to provide a payment service through data communication with the electronic device in a contact manner or a non-contact manner.

5. The electronic system of claim 1, wherein the application processor is configured to set up the secure channel between the application processor and the secure element through mutual authentication before transferring encrypted coupon credential received in response to a coupon issuance request message to the secure element.

6. The electronic system of claim 5, wherein the secure element is configured to decrypt the encrypted coupon credential received from the application processor through the secure channel and store the decrypted coupon credential.

7. The electronic system of claim 1, wherein the electronic device is configured to encrypt and transfer the coupon credential read from the secure element to the POS terminal in response to a coupon credential transfer request received from the POS terminal, and updates the coupon credential based on use of the coupon credential in electronic payment.

8. The electronic system of claim 1, wherein the secure element is configured to decrypt and store an updated coupon credential received from the POS terminal.

* * * * *